3,336,225
METHOD AND COMPOSITION FOR REDUCING FRICTION ON CONVEYORS
Richard S. Sayad and Arlie D. McMahan, Midland, Mich., assignors to The Dow Chemical Company, Midland, Mich., a corporation of Delaware
No Drawing. Filed Jan. 17, 1966, Ser. No. 520,904
13 Claims. (Cl. 252—34.7)

This invention relates to a method and composition for reducing friction on conveyors of the type wherein there is relative motion between the conveyor and the articles conveyed thereon, such as those wherein chutes, conveyor belts, and the like are used. More particularly, it relates to the use of aqueous soap solutions containing a small amount of an acrylamide polymer for reducing such friction.

Reducing friction on conveyor belts is particularly important in canneries and bottling plants at points of entry to continuous sterilizers, labeling machines, and the like. At such points, the objects, for example, glass bottles, metal cans, and the like tend to pile up and the conveyor must slip beneath them. Aqueous soap solutions are used almost universally for the purpose of reducing friction between the conveyor and the objects as the conveyor passes beneath them. The reduced friction results in significant power savings.

It has now been discovered that superior reduction in friction may be accomplished by incorporating into such aqueous soap solutions at least about .0002 percent by weight and preferably from about .0002 to .01 percent by weight of an acrylamide polymer having a molecular weight of at least about one-half million as determined by viscosity measurement. The resulting reduction in friction is greater than that obtained by an aqueous solution of either the soap or the polyacrylamide alone. Concentrations of .03 percent by weight and higher of the acrylamide polymer in admixture with soap gives satisfactory results, but the addition of more than .01 percent by weight of the polymer does not produce a corresponding increase in the reduction of friction.

The acrylamide polymer appears to have a synergistic effect with soap. At lower concentration levels no reduction in friction is obtained by using the acrylamide polymer alone in water, that is, at concentrations from about .001 to .008 percent by weight. At a concentration of about .01 percent by weight, a reduction in friction is obtained by using the polymer alone in water.

As used herein, the term "acrylamide polymers" encompasses water-soluble polymers and copolymers of acrylamide having a preponderance of amide groups, that is, having at least 50 mol percent acrylamide moieties. A portion of the amide group can be hydrolyzed to anionic carboxyl groups; these polymers are referred to as partially hydrolyzed polyacrylamides. Representative polymers for the practice of this invention include homopolymers of acrylamide and copolymers of acrylamide with other suitable monomers such as acrylic acid, methacrylic acid, methacrylamide, and the like.

Best results are obtained with cationic acrylamide polymers. Representative are copolymers of acrylamide and aminomethyl acrylates (for example, dimethylaminomethyl acrylate, N-dimethylaminomethyl acrylate, and N-vinylpyridine); copolymers of acrylamide and a secondary amine (for example, methylaminomethyl methacrylate); copolymers of acrylamide and (vinylbenzyl)trimethylammonium chloride; and dimethylamino substituted amides, for example, the reaction product of polyacrylamide and substantially equimolar quantities of formaldehyde and dimethylamine.

Amine soaps, alkali metal soaps (for example, sodium and potassium) and ammonium soaps are suitable for the solutions used in this invention. Preferable are the amine soaps formed by the reaction between carboxylic organic acids having from 2 to 25 carbon atoms and alkanolamines having molecular weights from about 60 to 195, such as isopropanolamine, triethanolamine, and the like. Best results are obtained using soaps prepared from carboxylic organic acids containing from 12 to 18 carbon atoms, for example, palmitic acid, stearic acid, oleic acid, linoleic acid, tall oil fatty acids (a mixture consisting primarily of oleic acid and linoleic acid), and the like.

Aqueous solutions of the soaps are advantageously formed by adding to water a sufficient amount of the organic acid and the amine to form the desired concentration of amine soap in water, that is, at least about .02 percent by weight, and preferably from about .06 to 1 percent by weight.

Suitable methods for preparing aqueous conveyor lubricant solutions are known in the art. Preferably, a concentrated aqueous solution containing from about .01 to 1.5 percent by weight acrylamide polymer and from about 1 to 65 percent by weight soap is diluted with water to give a solution having the desired concentration, that is, at least about .0002 percent by weight and preferably from about .0002 to .01 percent by weight of the acrylamide polymer. With the above ranges for the polyacrylamide and the soap in the concentrate, a 50 to 1 or 100 to 1 dilution with water is preferred. In this manner a lubricant solution having the desired concentration of polyacrylamide and soap may be easily prepared from the concentrate at the point of use. The composition may contain additional ingredients, such as antifoaming agents, wetting agents, coupling agents (i.e., solubilizing agents), antimicrobial agents, corrosion inhibitors, pH buffers or controls, and the like.

The method of this invention is ideally suited for use with a metal conveyor carrying glass bottles or metal cans. It may be used in similar situations where it is desired to reduce friction between solid surfaces, for example, where solid objects are to be moved on a slide.

While the following examples represent specific embodiments of the invention, the scope of the invention is limited only by the claims appended hereto.

*Example 1*

Isopropanolamine-fatty acid soaps were evaluated as conveyor lubricants in aqueous solutions, first without and then with acrylamide polymers. In each case, the soaps were prepared from isopropanolamine and the fatty acid listed. A motor-driven metal conveyor belt sliding beneath a weighted loading of glass bottles was used for these tests. Power curves were obtained for the runs, from which the data in Table I were obtained. The concentrations are in weight percent of the soap and acrylamide polymer in the lubricant solution, which was prepared by diluting a concentrate containing the soap and polymer with water in the ratio of 50 parts water to 1 part concentrate.

TABLE I

| Soap | Soap concentration, percent by wt. | Soap without acrylamide polymer (watts) | Soap with 0.006% by wt. acrylamide polymer [1] (watts) | Power saving with acrylamide polymer (watts) |
| --- | --- | --- | --- | --- |
| Acetic acid (2 carbon) | 0.36 | 1,000 | 800 | 200 |
| Caprylic acid (8 carbon) | 0.36 | 728 | 588 | 140 |
| Iso-stearic acid (18 carbon) | 0.1 | 486 | 449 | 37 |

[1] A cationic copolymer formed as the reaction product of polyacrylamide having a molecular weight of about 2 million, and equimolar quantities of formaldehyde and dimethylamine, thus converting about 50 mole percent of the acrylamide moieties to amine groups.

Example II

Acrylamide polymer-soap solutions were evaluated according to the procedure in Example I. In each case, an alkanolamine-fatty acid soap prepared from triethanolamine and tall oil fatty acids was used. Again, the concentrations represent the amount of soap and acrylamide polymer in the lubricant, which was prepared as in Example I.

In this manner acrylamide polymers having molecular weights of at least one-half million and having at least 50 mol percent acrylamide moieties were found to give substantial power savings over the soap solution alone. Best results were obtained with polymers having molecular weights between one-half million and three million. Table II represents data taken from the power curves obtained.

TABLE III

| Soap concentration, percent by wt. | Soap without polyacrylamide (watts) | Soap with .001 percent by weight polyacrylamide (watts) | Power savings with polyacrylamide (watts) |
| --- | --- | --- | --- |
| 0.1 | 525 | 475 | 50 |
| 0.2 | 500 | 450 | 50 |
| 0.3 | 475 | 400 | 75 |
| 0.5 | 462.5 | 400 | 62.5 |

Example IV

Comparative tests were run for a week on a conveyor carrying bottles to a labeling machine in a brewery. Runs

TABLE II

| Soap concentration, percent by weight | Power reading, soap without acrylamide polymer, watts | Acrylamide polymer concentration, percent by weight | Power reading, soap with acrylamide polymer, watts | Power savings with acrylamide polymer, watts |
| --- | --- | --- | --- | --- |
| 0.24 | 480 | [1] 0.004 | 444 | 36 |
| 0.24 | 480 | [2] 0.004 | 408 | 72 |
| 0.24 | 480 | [2] 0.008 | 420 | 60 |
| 0.04 | 468 | [3] 0.0025 | 408 | 60 |
| 0.04 | 468 | [3] 0.005 | 408 | 60 |
| 0.04 | 468 | [3] 0.01 | 420 | 48 |
| 0.1 | 468 | [3] 0.006 | 432 | 36 |
| 0.16 | 480 | [3] 0.0025 | 432 | 48 |

[1] Polyacrylamide with a molecular weight of about ½ million, as determined by viscosity measurement.
[2] Polyacrylamide with a molecular weight of about 1 million, as determined by viscosity measurement.
[3] Partially hydrolyzed polyacrylamide with a molecular weight between 2 and 3 million, as determined by viscosity measurement.

Example III

Lubricant systems prepared as in Examples I and II containing a soap formed from triethanolamine and iso-stearic acid and a polyacrylamide with a molecular weight of about one million as determined by viscosity measurement were evaluated to see if the polymer exerted a synergistic effect with soap. At concentrations from .001 to .008 percent by weight of the polyacrylamide and no soap, there was no reduction in the friction over water alone. With both the soap and the polyacrylamide in aqueous solution, a reduction in friction over that of the soap and water alone was obtained for the above concentrations of the polyacrylamide. This indicates that the polyacrylamide has a synergistic effect with soap. At a concentration of about .01 percent by weight, the polyacrylamide alone in water began to give a measurable reduction in friction. Table III represents data taken from the power curves for these runs.

were made to compare a commercially available conveyor lubricant with the acrylamide polymer-soap solution used as a lubricant in the present invention. The acrylamide polymer-soap lubricant had the following composition, expressed in weight percent—

| Ingredient: | Amount, percent |
| --- | --- |
| Acrylamide polymer [a] | 0.01 |
| Tall oil fatty acids | 0.24 |
| Mixed isopropanolamines | 0.12 |
| Propylene glycol, corrosion inhibited (coupling agent) | 0.38 |
| Sodium hydroxide (pH control) 50% by wt. aqueous solution | 0.28 |
| Antifoaming agent,[b] parts per million | 10 |
| Water (approx.) | 99 |

[a] A cationic copolymer formed as in Example I.
[b] Dow Corning Antifoam AF antifoaming agent, identified as a mixture of dimethylpolysiloxane, silica and water.

The tall oil fatty acids and the isopropanolamine combined to form the soap. The above lubricant was prepared by diluting a concentrate as in Examples I–III.

The commercial soap lubricant gave power readings of about 300 watts on the conveyor motor with a full load. The acrylamide polymer-soap lubricant gave power readings of about 250 watts on the same motor with a full load. For the week, the acrylamide polymer-soap lubricant gave a power savings of about 16 percent over the soap lubricant.

What is claimed is:

1. In the method of reducing friction on a conveyor by applying an aqueous amine, alkali metal, or ammonium soap solution to at least one of the surfaces between which friction is to be reduced, the improvement which comprises adding to said aqueous soap solution prior to application at least about .0002 weight percent of a water-soluble acrylamide polymer having a molecular weight of at least about one-half million and at least 50 mole percent acrylamide moieties.

2. The method of claim 1 wherein said acrylamide polymer has a molecular weight of from about one-half million to three million, and is added to said aqueous soap solution in an amount of from about .0002 to .03 weight percent.

3. The method of claim 1 wherein said acrylamide polymer is cationic.

4. The method of claim 3 wherein the cationic acrylamide polymer is the water-soluble reaction product of a polyacrylamide and equimolar quantities of formaldehyde and dimethylamine, wherein up to about 50 mole percent of the acrylamide moieties of the polyacrylamide have been converted to amine groups.

5. The method of claim 1 wherein said acrylamide polymer is added to said aqueous soap solution in the form of an aqueous solution containing from about .01 to 1.5 weight percent of said acrylamide, in an amount sufficient to give the desired concentration of said polyacrylamide in said aqueous solution.

6. A friction reducing composition which comprises an aqueous solution containing from about .02 to 1 percent of an amine, alkali metal, or ammonium soap and from about .0002 to .03 percent by weight of a water-soluble acrylamide polymer having a molecular weight of at least about one-half million and at least 50 mole percent acrylamide moieties.

7. The composition of claim 6, said composition additionally comprising a sufficient amount of an anti-foaming agent to reduce foaming.

8. The composition of claim 6 wherein said acrylamide polymer has a molecular weight of from about one-half million to three million, and is added to said composition in an amount of from about .0002 to .01 weight percent.

9. The composition of claim 8 wherein said acrylamide polymer is cationic.

10. The composition of claim 9 wherein said acrylamide polymer is the water-soluble reaction product of polyacrylamide and substantially equimolar quantities of formaldehyde and dimethylamine, wherein up to about 50 mole percent of the acrylamide moieties of the polyacrylamide have been converted to amine groups.

11. The composition of claim 6 wherein said soap is formed from an alkanolamine having a molecular weight from about 60 to 195 and a carboxylic organic acid having from 2 to 25 carbon atoms.

12. The composition of claim 11 wherein said carboxylic organic acid contains from 12 to 18 carbon atoms.

13. The composition of claim 12 wherein said alkanolamine is selected from the group consisting of isopropanolamine and triethanolamine and said carboxylic acid is selected from the group consisting of iso-stearic acid, oleic acid, linoleic acid, and tall oil fatty acid.

References Cited

UNITED STATES PATENTS

| | | | |
|---|---|---|---|
| 2,345,199 | 3/1944 | Hodson | 252—34.7 |
| 2,951,041 | 8/1960 | Saunders | 252—34.7 |
| 3,024,193 | 3/1962 | Gaynor et al. | 252—18 |

FOREIGN PATENTS

| | | |
|---|---|---|
| 1,104,371 | 4/1961 | Germany. |
| 836,303 | 6/1960 | Great Britain. |
| 927,446 | 5/1963 | Great Britain. |

DANIEL E. WYMAN, *Primary Examiner.*

C. F. DEES, *Examiner.*